United States Patent [19]

Bajka

[11] Patent Number: 4,635,674

[45] Date of Patent: Jan. 13, 1987

[54] DIVERTER VALVE ASSEMBLY AND METHOD

[76] Inventor: Peter Bajka, 725 Casita Way, Los Altos, Calif. 94022

[21] Appl. No.: 832,069

[22] Filed: Feb. 24, 1986

[51] Int. Cl.⁴ .............................................. F16K 5/22
[52] U.S. Cl. .......................... 137/246.22; 137/625.11; 137/625.41; 137/625.46; 137/876; 251/175
[58] Field of Search .................. 137/270, 246, 246.11, 137/246.12, 246.13, 246.15, 246.16, 246.22, 625.11, 625.41, 625.46, 625.47, 876; 251/172, 175

[56] References Cited

U.S. PATENT DOCUMENTS

| | | | |
|---|---|---|---|
| 1,710,176 | 4/1929 | MacGregor | 137/246.22 |
| 1,861,541 | 6/1932 | MacGregor | 137/246.22 |
| 1,932,322 | 10/1933 | Nordstrom | 137/246.16 |
| 2,337,841 | 12/1943 | Shafer | 137/553 |
| 2,388,827 | 11/1945 | Carter | 137/246.15 |
| 2,663,290 | 12/1953 | Walder | 123/190.0 |
| 2,719,032 | 9/1955 | Schnur | 261/21 |
| 2,747,600 | 5/1956 | Laurent | 137/246.22 |
| 3,424,190 | 1/1969 | Wofensperger | 137/246.15 |
| 3,584,641 | 6/1971 | Milleville et al. | 137/246.22 |
| 3,656,498 | 4/1972 | Grove et al. | 137/246.22 |
| 4,322,297 | 3/1982 | Bajka | 210/742 |
| 4,470,429 | 9/1984 | Johnson | 137/270 |

*Primary Examiner*—George L. Walton
*Attorney, Agent, or Firm*—Manfred M. Warren; Robert B. Chickering; Glen R. Grunewald

[57] ABSTRACT

A diverter valve for a swimming pool/spa system is disclosed which has a lubricated seal assembly for the diverter portion of the valve. Valve lubrication is accomplished without valve disassembly. A method for minimizing the diameter of a valve body for a valve having a selected one of three, five, six or seven ports while still permitting the valve to be used with standard plumbing fittings is also disclosed.

8 Claims, 8 Drawing Figures

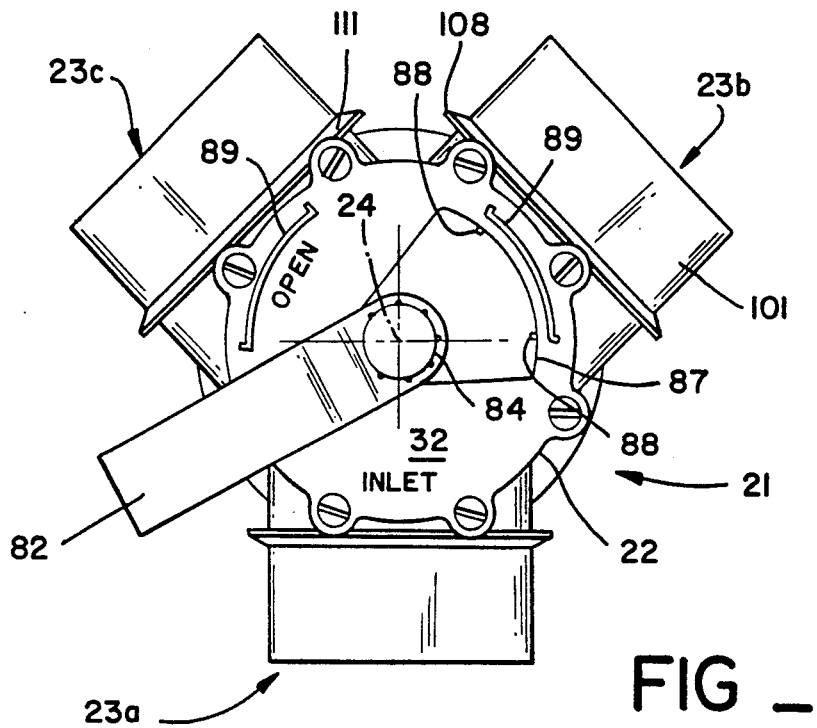
FIG_1
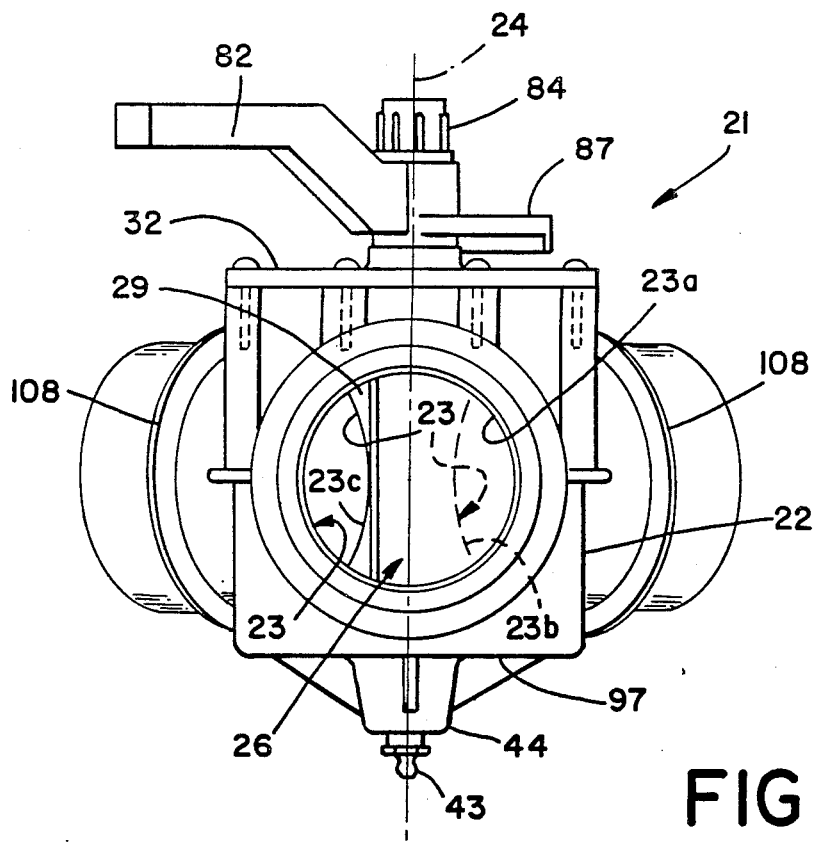
FIG_2

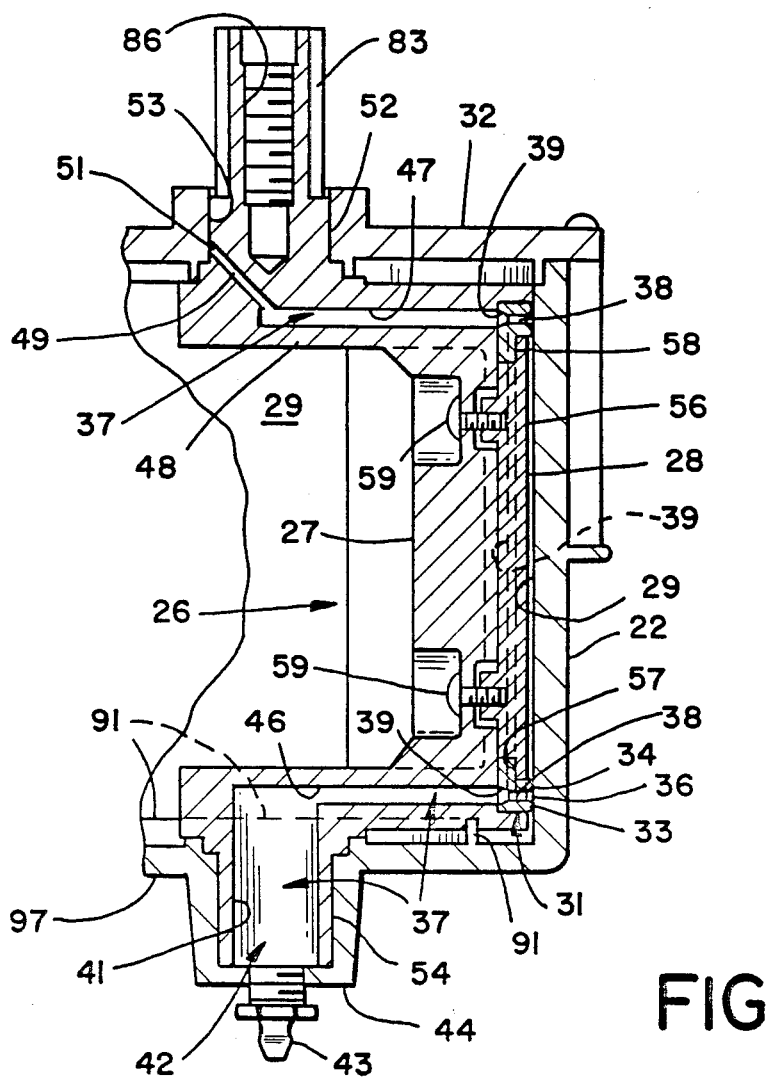
FIG _ 3
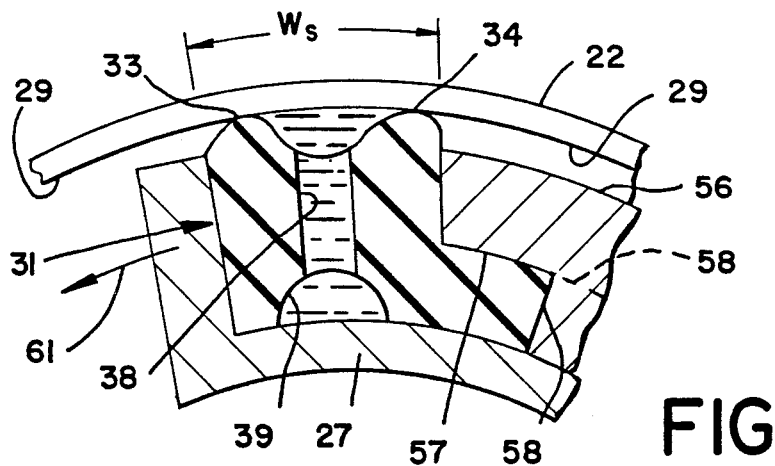
FIG _ 6

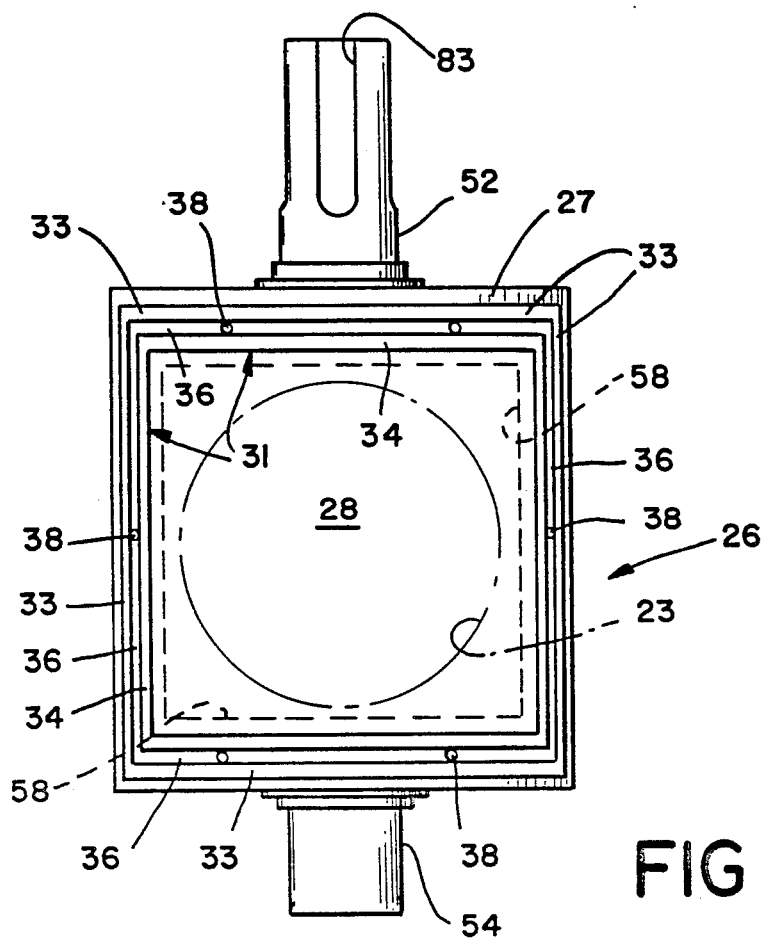
FIG_4
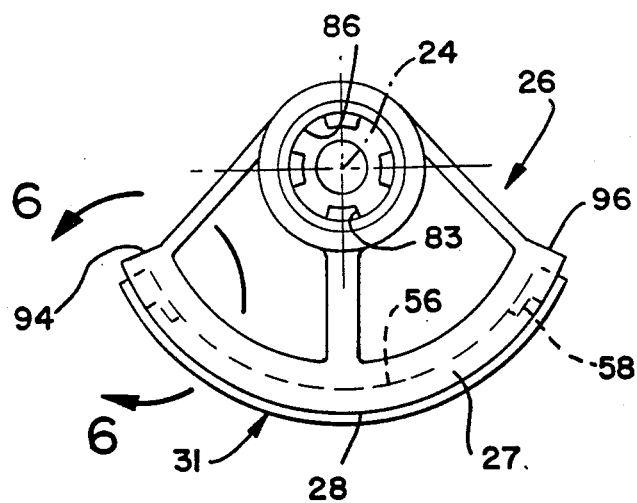
FIG_5

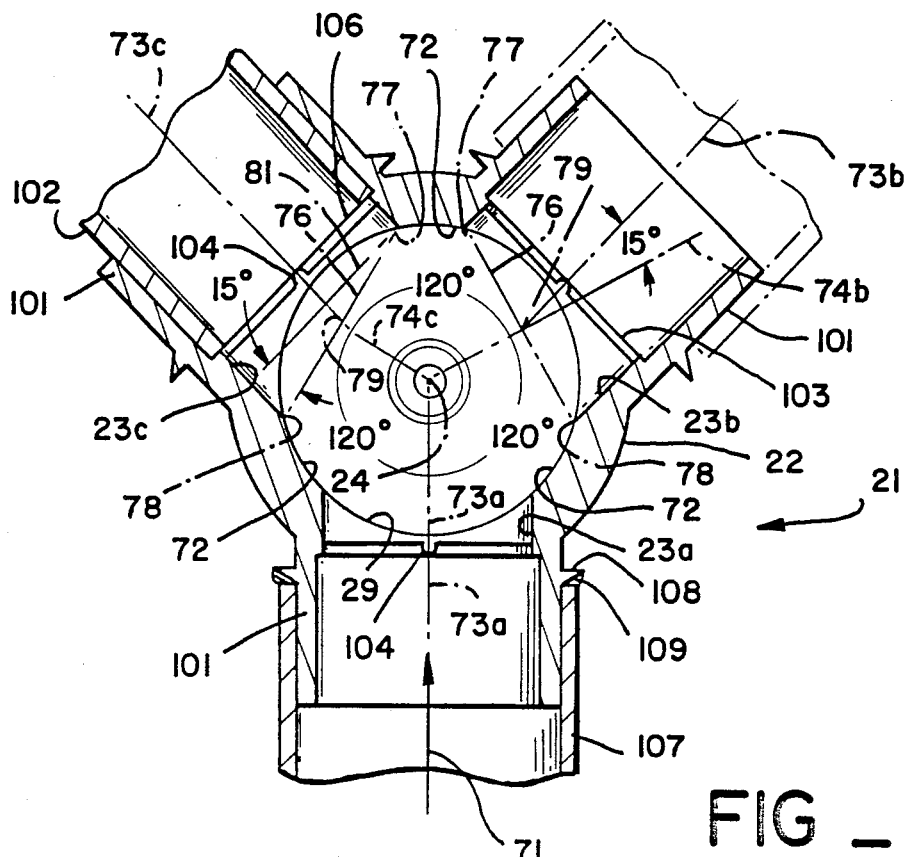
FIG_7
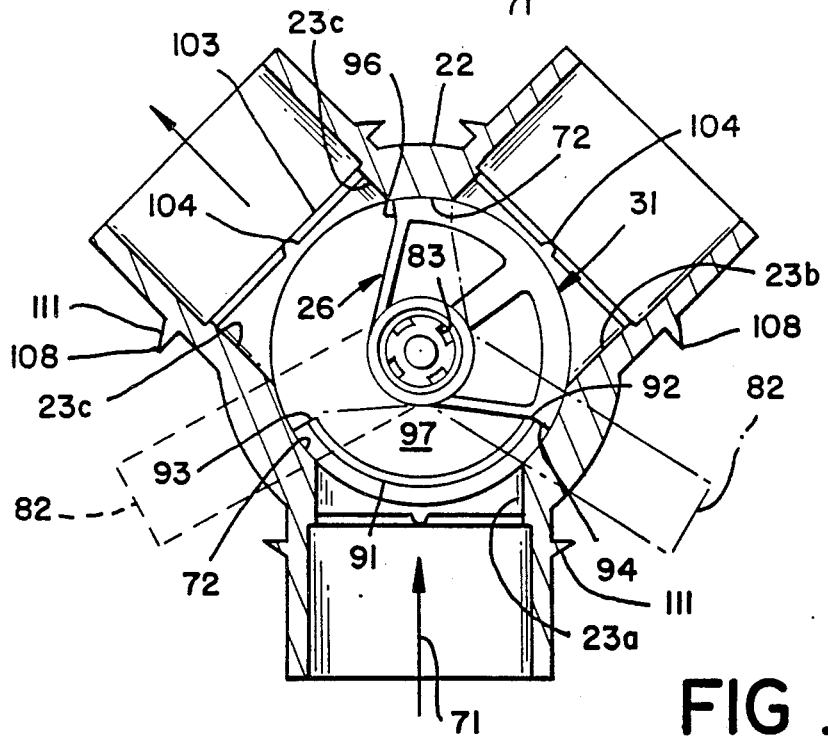
FIG_8

DIVERTER VALVE ASSEMBLY AND METHOD

BACKGROUND OF THE INVENTION

The present invention relates, in general, to rotary valves, and more particularly, relates to cylindrical or spherical rotary valves having arcuate rotatable diverter elements which are used to direct the flow of fluids through the valve.

Rotary diverter valves are extensively used in swimming pool and spa systems. Such valves are typically driven by a valve actuator and operated in accordance with a sequence controlled by a system controller, for example, a controller of the type set forth in my U.S. Pat. No. 4,322,297. Alternatively, such rotary diverter valves may be manually operated.

Swimming pool diverter valves direct the flow of water between such system elements as the pool, spa, solar heater, gas heater and filter. Such valves are routinely exposed to relatively adverse environments, namely, the flow of heated and chlorinated water through the valve. Accordingly, one of the commonly encountered problems in connection with swimming pool/spa systems has been the lubrication of the diverter valves so that their operation is reliable and does not have high power requirements for the valve actuator.

Although not in use in the swimming pool industry, lubricated plug valves are broadly known. Such valves typically are formed with metal bodies and have a metal plug rotatably mounted therein. The rotatable plug and valve body are conventionally machined to close tolerances and are based upon metal-to-metal contact during motion of the plug within the body. Grooves for the flow of lubricant have been provided in the body housing, and in some instances, in the face of the rotatable plug. In such metal-to-metal diverter valve assemblies, the high pressure seal between the rotating parts is usually effected by the lubricant itself. This is possible because the parts are all metallic and have dimensional stability under high pressure. Typical of such metallic rotary plug valve constructions are the valves disclosed in U.S. Pat. Nos. 1,710,176; 1,861,541; 1,932,322; 2,337,841; 2,388,827; 2,663,290; 2,719,032; and 3,424,190.

A valve of the type used in swimming pool and spa systems is the valve set forth in U.S. Pat. No. 4,470,429. Such valves are formed of high strength plastic materials and include a top or cover plate which allows the valve to be opened and the diverter removed. Approximately every two-to-four months the pool/spa owner or maintenance personnel should remove the valve cover and wipe a lubricant on the diverter and interior of the valve surfaces. As will be appreciated, this maintenance step is often not undertaken, or if the service is provided by a maintenance company, such valve maintenance can be costly.

Problems have also been encountered in connection with the installation of rotary diverter valves in swimming pools/spa systems. Some valves have an undesirably large volume. The valve set forth in U.S. Pat. No. 4,470,429, for example, has a relatively large diameter body in order that the three ports or passageways to and from the valve can be placed at 90 degree intervals about the rotatable axis of the valve. Since swimming pool valves are most preferably used with conventional plumbing fittings, the 90 degree orientation of the valve ports in the valve of U.S. Pat. No. 4,470,429 is highly desirable. Rotation of the ports at 120 degree intervals would permit a reduction in the body size of the valve, but such a valve construction would also require specialized adapter fittings to enable coupling to conventional plumbing fittings, which are constructed for connections at angles which are multiples of 45 degrees.

OBJECTS AND SUMMARY OF THE INVENTION

Accordingly, it is an object of the present invention to provide a lubricated diverter valve which is relatively compact and suitable for use with standard plumbing fittings.

Another object of the present invention is to provide a diverter valve assembly in which the port diameters of the valve are maximized while the body diameter is minimized for a valve that can be used with standard plumbing fittings.

Another object of the present invention is to provide a lubricated diverter valve assembly formed of a plastic material in which a high pressure seal is obtained, not by the lubricant, but by a sliding seal structure.

A further object of the present invention is to provide a diverter valve assembly having an improved structure for mounting of connecting conduits thereto and an improved structure for limiting the rotary motion of the diverter element.

Still another object of the present invention is to provide a diverter valve assembly which has improved durability, is easier to maintain, has a relatively low cost and can be installed with conventional tools by a plumber.

The diverter valve of the present invention has other objects and features of advantage which will be set forth in more detail in and become apparent from the accompanying drawing and description of the preferred embodiment.

The diverter valve assembly of the present invention includes a housing with a plurality of openings spaced circumferentially about a central axis of the housing, a valve body mounted in the housing for rotation about the axis and having a diverter portion substantially mating with the interior surface of the housing proximate the openings. A seal assembly is carried by the diverter and slidably sealed against the interior surface of the valve housing. Lubricant passageway means are provided in the housing and valve body for the flow of lubricant to surfaces to be lubricated. The improvement in the diverter valve of the present invention comprises, briefly, the seal assembly being formed as an endless ring-type flexible seal member mounted to the diverter portion of the valve body and dimensioned to extend around the openings in the valve body when the diverter is positioned in front of the openings. The flexible seal member has two resiliently displaceable side-by-side endless ribs defining an endless groove therebetween encircling the openings, and the lubricant passageway means includes portions which extend through the flexible seal to the endless groove for the discharge of lubricant between the diverter and interior surface of the housing from the endless groove.

In another aspect of the present invention, the improvement in the diverter valve includes a valve assembly having a selected one of three, five, six and seven ports with the ports circumferentially evenly spaced about the valve housing to define substantially equal areas of the interior surface of the housing therebetween and the ports being oriented with the longitudinal axes of their bores each at an angle with respect to the longitudinal axis of a reference bore equal to a multiple of 45 degrees.

DESCRIPTION OF THE DRAWING

FIG. 1 is a top plan view of a diverter valve constructed in accordance with the present invention.

FIG. 2 is a front elevation view of the valve of FIG. 1.

FIG. 3 is an enlarged, fragmentary, cross-sectional view corresponding to FIG. 2 of the valve body and diverter member showing the lubrication passageways.

FIG. 4 is a front elevation view of the diverter member removed from the housing of the valve of the present invention.

FIG. 5 is a top plan view of the diverter member shown in FIG. 4.

FIG. 6 is an enlarged, fragmentary, cross-sectional view of the area bounded by line 6—6 in FIG. 5.

FIG. 7 is a top plan view in cross section of the diverter valve body showing the port arrangement.

FIG. 8 is a top plan view, in cross section corresponding to FIG. 7 with the diverter member positioned in the valve body.

DESCRIPTION OF THE PREFERRED EMBODIMENT

The diverter valve assembly of the present invention is particularly well suited for use in swimming pool/spa systems for manual or powered operation. As shown in FIGS. 1-3, diverter valve 21 includes a valve housing 22 with a plurality of openings 23 spaced circumferentially about central axis 24 of the housing. Mounted in housing 22 for rotation about axis 24 is a diverter member, generally designated 26, having a diverter portion 27 with an arcuate surface 28 that substantially mates with interior arcuate surface 29 of housing 22.

Diverter member 26 is best seen in FIGS. 4 and 5, and since it is preferable to form valve assembly 21 from a plastic material, diverter member 26 preferably carries a seal assembly, generally designated 31. Seal assembly 31 slidably seals against arcuate inner surface 29 of the valve housing to prevent the flow of fluid between diverter portion 27 and surface 29. Arcuate diverter portion 27 is dimensioned to span across the various openings 23 in housing 22 so that seal assembly 31 engages interior surface 29 of the housing at a position encircling the port or opening 23 in front of which the diverter member has been rotated. The seal assembly thereby provides a high pressure seal against the flow of water around the diverter, notwithstanding the formation of the housing body and diverter member out of plastic materials.

In order to maintain the high pressure seal, seal assembly 31 does apply a substantial pressure between diverter member 26 and housing 22. Accordingly, it is necessary for the smooth and reliable rotation of diverter member 26 within housing 22 for the valve to be lubricated along interior surface 29. This lubrication has conventionally been provided by removing cover 32 from housing 22 and wiping surface 29 with a lubricant, for example, a silicon-based lubricant. While this lubricating procedure need only be undertaken every few months during normal operation of the diverter valve in a swimming pool system, it is somewhat tedious and time consuming. Accordingly, valve assembly 21 of the present invention provides a lubricating system which can be employed to lubricate the valve without the need for valve disassembly.

As best may be seen in FIG. 4, seal assembly 31 is preferably formed as an endless ring-type flexible seal member mounted to diverter portion 27. Flexible seal member 31 includes two resiliently displaceable side-by-side ribs 33 and 34 which define an endless groove 36 therebetween. The seal assembly 31 is dimensioned so that groove 36 encircles the selected one of the openings 23 over which the diverter portion 27 is positioned.

Lubrication of rotation of diverter member 26 is provided by lubricant passageway means, generally designated 37 which includes passageway portions or bores 38 that extend through flexible seal 31 for the discharge of lubricant to groove 36. Bore 38 communicates with a groove or recess 39 (best seen in FIG. 6) in the backside of flexible seal member 31. Groove 39 extends around the periphery of seal member 31 on the backside of the seal member in general alignment with groove 36 on the front side of the seal member.

In order to communicate lubricant to groove 36 for discharge against the inner surface 29 of the valve housing, it is preferable that the lubricant passageway means 37 includes a passageway portion 41 in lower valve stem 54 having an opening 42 in general axial alignment with a lubricant fitting 43 mounted to housing 22 proximate the hub portion 44 of the housing. Passageway 41 in turn is connected to passageway portion 46 for the radial flow of lubricant from the central axis of the diverter member out to groove 39. Groove 39 communicates the lubricant to a radially inwardly extending lubricant passageway portion 47 in the top arm 48 of the diverter member. Finally, a passageway portion 49 is connected to passageway 47 and has a discharge opening 51 positioned between diverter member upper stem 52 and housing wall 53.

Thus, the lubricating passageway means 37 of the present invention discharges lubricant between lower stem 54 and housing wall 44 through opening 42, discharges lubricant along surface 29 from groove 36, and discharges lubricant between upper stem 52 and wall 53 through opening 51.

The endless flexible seal member 33 is preferably secured to the diverter portion 27 of member 26 by an arcuate retention plate 56 having a downwardly facing lip 57 which engages and clamps an inwardly extending leg portion 58 of the seal member. Clamping member 56 is secured in place in diverter body 27 by fasteners 59 (FIG. 3).

The double-ribbed seal construction with the lubricant recess 36 therebetween is highly effective in wiping or in effect pumping lubricant out against inner surface 29 of the valve housing. As thus may be seen in FIG. 6, motion of diverter portion 27 in the direction of arrow 61 tends to cause distortion of ribs 33 and 34 under the friction forces in an opposite direction. This distortion to the right in FIG. 6 urges or in effect pumps lubricant out under rib 34 against surface 29 as the diverter member rotates. This pumping action is particularly effective for the longitudinally extending pairs of ribs since they are displaced transversely to the ribs upon rotation of the diverter. The circumferentially extending portions of the seal do not transmit as much lubricant to the inner surface 29, but the surface area over which this portion of the seal travels is also much less.

Another aspect of the diverter valve assembly of the present invention is to provide a diverter valve having a minimum diameter and yet one which is compatible for use with standard plumbing fittings. Diverter valves which have two, four or eight ports can be easily designed for use with standard plumbing fittings by simply evenly spacing the ports about the central axis 24. Two-port valves will have the ports spaced at 180 degrees, four-port valves at 90 degrees, and eight-port valves at 45 degrees. The minimum diameter of housing 22 is simply determined by the diameter of the ports, plus a circumferentially extending space proximate the ports for sealing of seal assembly 31 against the interior surface of the housing.

When diverter valves having three, five, six or seven ports are to be employed, however, minimizing the housing diameter while still maintaining the ports at angles suitable for coupling to standard plumbing fittings is more difficult. The typical approach is shown in U.S. Pat. No. 4,470,429 in which a three-port valve merely spaces the ports at 90 degrees and enlarges the housing body to accommodate this spacing. The body of the valve, however, is larger than necessary because two of the ports are spaced at 180 degrees from each other.

The other approach which has been employed in the prior art is simply to space the valves at equal angular intervals and use specialized adapter fittings to integrate the valve into the associated plumbing conduits.

The diverter valve assembly of the present invention is designed so that valves having three, five, six and seven ports can be formed in a valve body 22 of minimum diameter and yet the valve can be coupled to the necessary plumbing by standard plumbing fittings which are available at angles having increments of 45 degrees. This construction may best be understood by reference to FIGS. 7 and 8 and is here illustrated for a three-port diverter valve, one of the most commonly employed in swimming pool/spa systems.

As will be seen in FIG. 7, valve body 22 includes three ports 23a, 23b, and 23c in housing wall 22 which extend to the inner cylindrical surface 29 formed to receive diverter member 26. Opening 23a can be considered an inlet opening, as indicated by arrow 71, and ports 23b and 23c may be considered outlet openings from the cylindrical cavity bounded by interior surface 29.

The location and orientation of ports 23 in housing body 22 is established by circumferentially spacing the openings or ports about the periphery of the housing so as to define surfaces 72 of interior surface 29 having substantially equal area. Moreover, surfaces 72 are preferably formed to have a circumferential distance about axis 24 which is sufficient to permit sealing of seal assembly 31 carried by the diverter member 26 against the sealing surface 72. Thus, the sealing surfaces 72 basically have a minimum area between the adjacent ports as required by the seal assembly to effect a seal.

The ports or openings themselves are oriented so that the central longitudinal axes 73a, 73b and 73c are oriented at about a multiple of 45 degrees with respect to each other. This can be accomplished by considering one of the ports as a reference port and adjusting the angular orientation of the central longitudinal axes of the remaining ports to the closest 45 degree angle while still maintaining the areas 72 between the ports as substantially equal areas.

For the three-port valve shown in FIG. 7, port 23a can be considered the reference port. As will be seen, a subaxis 74b and a second subaxis 74c can be laid out at 120 degree intervals on either side of axis 73a. However, 120 degrees is not compatible with a standard plumbing fitting, but 135 degrees or 90 degrees would be compatible. In the case of 135 degrees, a standard 90 degree and a standard 45 degree fitting can be combined. The closest multiple of 45, therefore, is 135 degrees, and the central axes 73b and 73c must be angularly adjusted to 135 degrees from axes 73a. This adjustment can be accomplished by drawing a line 76 perpendicular to subaxes 74b and 74c at a radial distance from axis 24 which will cause the ends 77 and 78 to intersect interior surface 29 of the cylindrical cavity so as to define sealing surfaces 72 of equal area. The longitudinal axes of ports 23b and 23c, namely, axes 73b and 73c are then swung by 15 degrees about the point of intersection 79 of the lines 76 with the subaxes 74b and 74c. Alternatively, line 76 can be pivoted about point 77 by 15 degrees, which will then result in a line 81 which will be perpendicular to center line 73c and will basically be the diameter of port 23c.

The minimum circumference of interior surface 29 can be calculated as follows. Circumference of surface 29, $C_v$, is equal to the number of ports in the valve, N, times the sum of the port diameter, $D_p$, plus two times the width of the seal, $W_s$. In order to allow for some angular misalignment, it is assumed that sealing surface 72 must be at least twice the width of the seal, $W_s$, that is, twice the distance between the outer edges of ribs 33 and 34, as shown in FIG. 6. Thus the circumference of surface 29 can be expressed as follows:

$$C_v = \pi(D_p + 2W_s)/\text{Sin}(180/N)$$

where N is the number of ports, $D_p$ is the diameter of the ports, and $W_s$ is the circumferential width of the seal.

Additionally, if one wishes to locate the radial distance of points 79 from axis 24, that distance, d is equal to:

$$d = 0.5\sqrt{4R^2 - D_p^2}$$

where R equals the radius of the valve body, and $D_p$ equals the diameter of the ports.

As will be seen from FIGS. 1, 7 and 8, therefore, the two outlet valve ports are positioned at 135 degree angles with respect to inlet port 23a so that standard plumbing fittings can be used, and yet the ports are also positioned about the valve body so that the space between ports is equal and minimized to that required for sealing of the diverter element between the ports.

The diverter valves assembly of the present invention is shown with a manually engageable handle 82 mounted on splines 83 on upper valve stem 52 by a removable fastener element 84 threadably secured to bore 86. As will be understood, valve assembly 21 can also be operated by a powered valve actuator which is coupled to stem 52. It is preferable that handle 82 include sector-shaped portion 87 with indicia 88 that matches with indicia 89 on valve cover 32 so as to schematically illustrate the position of diverter 26 within housing 22. Thus, as shown in FIGS. 1 and 8, diverter 26 is positioned in front of outlet port 23b which opens outlet port 23c. The indicia 89 proximate port 23c indicates "OPEN" and sector portion 87 covers a similar inscription proximate port 23b. When handle 82 is swung to the phantom line position shown in FIG. 8, diverter 26 will swing in front of port 23c and the indicia 88 on sector 87 will align with indicia 89 proximate port 23c.

In order to prevent undesirably high pressures in the hydraulic system of the spa or pool, it is preferable to provide stop means in the diverter valve positioned so as to prevent closure of diverter 26 across inlet port 23a. In the diverter valve of the present invention such stop means can be seen in FIGS. 3 and 8 as a circumferentially extending flange 91, having ends 92 and 93 positioned to engage the edges 94 and 96 of diverter assembly 26 as it is rotated in housing 22. It is preferable that flange 91 be formed in the inner or lower surface 97 of the valve body, instead of cover 32, so that it will permanently be positioned in front of inlet opening 23a. This also reduces stress forces on the valve.

The mounting of conduits to diverter valve 21 can be accomplished in two manners. It is preferable that each of the ports include a collar 101 extending outwardly a short distance from valve body 22 parallel to the central axes of the respective ports. Collars 101 can receive a conduit 102 (FIG. 7) inside the collars, and each of the collars is preferably formed with a shoulder 103 against which the ends of conduit 102 may abut. It is also preferable and known in the art to provide a rib 104 against which the end of conduit 102 will bear that defines an annular space designed to receive any overflow glue or adhesive 106 used to secure conduit 102 inside collar 101.

For applications in which conduits 107 are to be secured to the exterior of collars 101, diverter valve assembly 21 preferably includes radially extending adhesive diverting flanges 108 so that overflow or adhesive flash 109 proximate the ends of conduits 107 are diverted outwardly by the sloping surfaces 111. Valve body 22 and diverter assembly 26 are preferably formed high-strength plastic materials. This allows the assembly to be easily adjoined by conventional plastic adhesives to the plastic conduit and plumbing fittings typically employed in spa and swimming pool systems.

What is claimed is:

1. In a diverter valve having a valve housing with a plurality of openings spaced circumferentially about a central axis of said housing, a diverter member mounted in said housing for rotation about said axis and having a radially outwardly extending portion, and a diverter portion substantially mating with the interior surface of said housing proximate said openings and extending circumferentially about said axis a distance sufficient to span across one of said openings upon positioning of said diverter portion in front of said one of said openings, a seal assembly carried by said diverter portion and slidably sealing against fluid flow between said diverter portion and said interior surface, and lubricant passageway means formed in said housing and through said radially outwardly extending portion for the flow of a lubricant therein, said diverter portion includes a removable arcuate retention plate means, wherein the improvement in said diverter valve comprises:
   said seal assembly being formed as an endless ring-type flexible seal member mounted to said diverter portion and disposed between and in abutting engagement with said passageway means and said arcuate plate means to slidably engage said interior surface, said flexible seal member being dimensioned to extend around said one of said openings when said diverter portion is positioned in front of said one of said openings, said flexible seal member having two resiliently displaceable side-by-side endless ribs defining an endless groove therebetween encircling said one of said openings, and
   said lubricant passageway means including passageway portions extending through said flexible seal member to said endless groove for the discharge of lubricant between said diverter portion and said interior surface from said endless groove to provide lubrication for easy rotation of said diverter member without the need for diassemble of said diverter valve.

2. The diverter valve as defined in claim 1 wherein,
   said lubricant passageway includes a channel extending around said flexible seal member in a side thereof opposite said side having said endless groove, and
   said passageway portions extending from said channel to said endless groove for the flow of lubricant from said channel to said endless groove.

3. The diverter valve as defined in claim 2 wherein,
   said interior surface of said housing is a surface of revolution;
   said valve body includes a pair of valve stems rotatably mounted to said housing at said axis, a pair of radially extending body portions coupled to said valve stems and extending outwardly therefrom, and an axially extending sector-shaped diverter portion carried by said radially extending body portions, said diverter portion having a face which is a surface of revolution of slightly smaller radius than said interior surface of said housing, and said face having a recess therein dimensioned to receive said flexible seal member;
   said flexible seal member is mounted in said recess; and
   said lubricant passageway including an axial lubricant passageway in one of said valve stems, a first radially extending lubricant passageway in a first of said radially extending body portions, said radially extending lubricant passageway communicating with said axial lubricant passageway and extending to said channel in said flexible seal member at one end of said flexible seal member, a second radially extending lubricant passageway formed in a second of said radially extending body portions, said second radially extending passageway extending between said channel at one opposite end of said flexible seal member and the remainder of said valve stems, and a discharge passageway extending between said second radially extending lubricant passageway and a position between said remainder of said valve stems and said housing.

4. The diverter valve as defined in claim 2 wherein,
   said housing is substantially cylindrical, and
   said flexible seal member is formed with two pairs of ribs extending in a direction along the central longitudinal axis of said housing to define a pair of grooves spaced apart by a distance spanning said openings.

5. The diverter valve as defined in claim 1 wherein,
   said housing is cylindrical and includes a planar lower end wall integrally formed with a cylindrical side wall and a removable planar upper end wall secured by fastener means to said side wall, and
   stop means formed in said lower end wall and positioned to engage said diverter portion and prevent rotation of said diverter portion to a position completely blocking a selected one of said openings used as an inlet opening to said housing.

6. The diverter valve as defined in claim 1 wherein, said openings include an inlet opening and at least two discharge openings and said inlet opening and discharge openings are evenly circumferentially spaced about the periphery of said housing with said interior surface of said housing intermediate said openings being of substantially equal area, and said housing includes cylindrical discharge collars surrounding said discharge openings and extending outwardly from said housing with the central longitudinal axes of said collars being oriented at about a multiple of 45 degrees with respect to each other.

7. The diverter valve as defined in claim 6 wherein, said collars each include radially extending adhesive diverting flanges on the exterior surface thereof spaced inwardly from the distal ends of said collars.

8. The diverter valve as defined in claim 7 wherein, said flanges include a surface facing and sloping away from said distal ends.

* * * * *